United States Patent

Murata

[11] Patent Number: 5,212,722
[45] Date of Patent: May 18, 1993

[54] HANDS-FREE TELEPHONE HAVING A HANDSET VOLUME ATTENUATOR FOR CONTROLLING SPEAKER VOLUME IN A HANDS-FREE ADAPTOR

[75] Inventor: Yukio Murata, Tokyo, Japan

[73] Assignee: NEC Corporation, Tokyo, Japan

[21] Appl. No.: 905,229

[22] Filed: Jun. 29, 1992

Related U.S. Application Data

[63] Continuation of Ser. No. 556,515, Jul. 24, 1990, abandoned.

[30] Foreign Application Priority Data

Jul. 24, 1989 [JP] Japan ................... 1-188812

[51] Int. Cl.⁵ .............................. H04M 11/00
[52] U.S. Cl. ...................... 379/58; 379/390; 379/409; 379/420; 455/249.1
[58] Field of Search ............ 379/58, 59, 63, 390, 379/391, 406, 409, 420, 437, 451; 370/32; 455/249.1

[56] References Cited

U.S. PATENT DOCUMENTS

| | | | |
|---|---|---|---|
| 3,214,526 | 10/1965 | Mitchell | 379/409 |
| 3,942,116 | 3/1976 | Ferguson et al. | |
| 4,811,390 | 3/1989 | Garabedian et al. | |
| 4,982,425 | 1/1991 | Yoshida | 379/58 |

FOREIGN PATENT DOCUMENTS

WO87/01255 2/1987 PCT Int'l Appl. .

OTHER PUBLICATIONS

Popular Science advertisement, DAK Industries Inc., "Headphone Phone", Aug. 1983, p. 23.

Primary Examiner—Curtis Kuntz
Assistant Examiner—Dwayne D. Bost
Attorney, Agent, or Firm—Sughrue, Mion, Zinn, Macpeak & Seas

[57] ABSTRACT

A hands-free telephone for use on a vehicle includes a handset incorporating a radio section therein and a hands-free adapter incorporating a hands-free telephone unit therein. To prevent howling, the telephone includes two variable attenuators, or variolossers, each for changing the level of respective ones of a receive and a transmit signal to be applied to a speaker of the hands-free telephone unit and the radio section, respectively, so as to maintain the two levels in a predetermined relation. The telephone also includes in the radio section a variable resistor which may adjust the volume of voice signal to be delivered through an earpiece within the radio section which adjusts the volume of voice signal to be delivered through the speaker. The level-adjusted voice signal to be delivered through the speaker is controlled in level by a third variable attenuator simultaneously with the above-mentioned variable attenuators.

14 Claims, 4 Drawing Sheets

HANDS-FREE TELEPHONE HAVING A HANDSET VOLUME ATTENUATOR FOR CONTROLLING SPEAKER VOLUME IN A HANDS-FREE ADAPTOR

This is a continuation of application Ser. No. 07/556,515 filed Jul. 24, 1990, now abandoned.

BACKGROUND OF THE INVENTION

The present invention relates to a hands-free telephone and, more particularly, to a hands-free telephone advantageously applicable to a automobile telephone or similar mobile telephone system.

It is a common practice with an automobile or car telephone or similar mobile telecommunications equipment to allow conversation to be selectively held on either a mouthpiece and an earpiece built in a handset or an optional hands-free telephone.

A hands-free telephone for on-board use includes an antenna and a radio section which are incorporated in a handset, and a hands-free telephone unit fixed in place within the vehicle cabin. The antenna transmits and receives a radio signal from a base station. The radio section includes a transmitter for transmitting a transmit signal by converting it into a radio signal, a receiver for converting a received radio signal into a received signal, and an antenna duplexer for coupling or uncoupling the transmit and receive radio signals. A variable resistor is provided for adjusting the level of a receive signal to be fed from the receiver to the earpiece. The hands-free telephone unit has a microphone for converting transmit voice into a transmit signal, a first variable attenuator, or variolosser, for attenuating the level of the transmit signal from the microphone in response to a control signal, a second variable attenuator, or variolosser, for attenuating the level of the receive signal from the receiver, a comparator for producing a control signal in response to the transmit and receive signals from the microphone and second variolosser, respectively, and a speaker for converting the receiver signal into voice. While the hands-free telephone is not used, a transmit signal input terminal and a receive signal output terminal of the radio section are connected to, respectively, a transmit and a receive circuit of the handset.

Generally, a hands-free telephone suffers from howling or singing ascribable to the acoustic coupling between a microphone and a speaker. Usually, therefore, a hands-free telephone is constructed such that when transmit voice is inputted, the attenuation by the second variable attenuator is increased while, when receive voice is outputted, the attenuation by the first variable attenuator is increased. The loop gain of the telephone communications loop including the acoustic coupling circuit between the microphone and the speaker is decreased to eliminate howling or singing.

The hands-free telephone unit usually has a variable resistor for adjusting the volume of voice coming out of the speaker, and such a variable resistor of course needs an extra space for installation. When the hands-free telephone is used as an on-board telephone and the hands-free telephone unit thereof is installed in the vehicle cabin, it is necessary that the above-mentioned variable resistor be located within the user's reach. However, locating the variable resistor having a substantial size in the limited space available in the vehicle cabin is objectionable from the comfortableness and appearance viewpoint.

In the light of the above, the receive signal whose level has been changed by the variable resistor built in the handset may be used as a receive signal to be applied to the hands-free telephone unit. Such a scheme, however, would also change the level of the received signal to be fed to the comparator and would thereby render the volume control at the time of transmission/reception switching unstable.

SUMMARY OF THE INVENTION

It is therefore an object of the present invention to provide a hands-free telephone which allows the volume of received voice to be controlled without resorting to a variable resistor heretofore incorporated in a hands-free telephone unit.

It is another object of the present invention to provide a small-size hands-free telephone unit.

A hands-free telephone of the present invention has a radio section, and a hands-free telephone unit. The radio section has a transmitting and receiving section for transmitting a transmit signal by converting it into a radio signal and converting a received radio signal into a receive signal, and a first attenuating section for variably attenuating the receive signal from the transmitting and receiving section. The hands-free telephone unit has a second attenuating section for variably attenuating the transmit signal from a microphone section in response to a control signal, a third attenuating section for variably attenuating the receive signal from the transmitting and receiving section in response to a control signal, a fourth attenuating section for variably attenuating the receive signal from the first attenuating section in response to a control signal, a comparing section for emitting the control signals in response to the transmit signal from the microphone and the receive signal from the third attenuating section, and a voice emitting section for converting the receive signal from the fourth attenuating section into voice.

The second and third variable attenuating sections are used to control howling or singing, while the first and fourth variable attenuating sections are used to adjust the volume of the voice emitting section. Such a configuration eliminates the need for a variable resistor or similar attenuating section heretofore installed in a hands-free telephone unit for variably attenuating a receive signal.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENT

Figure 1:
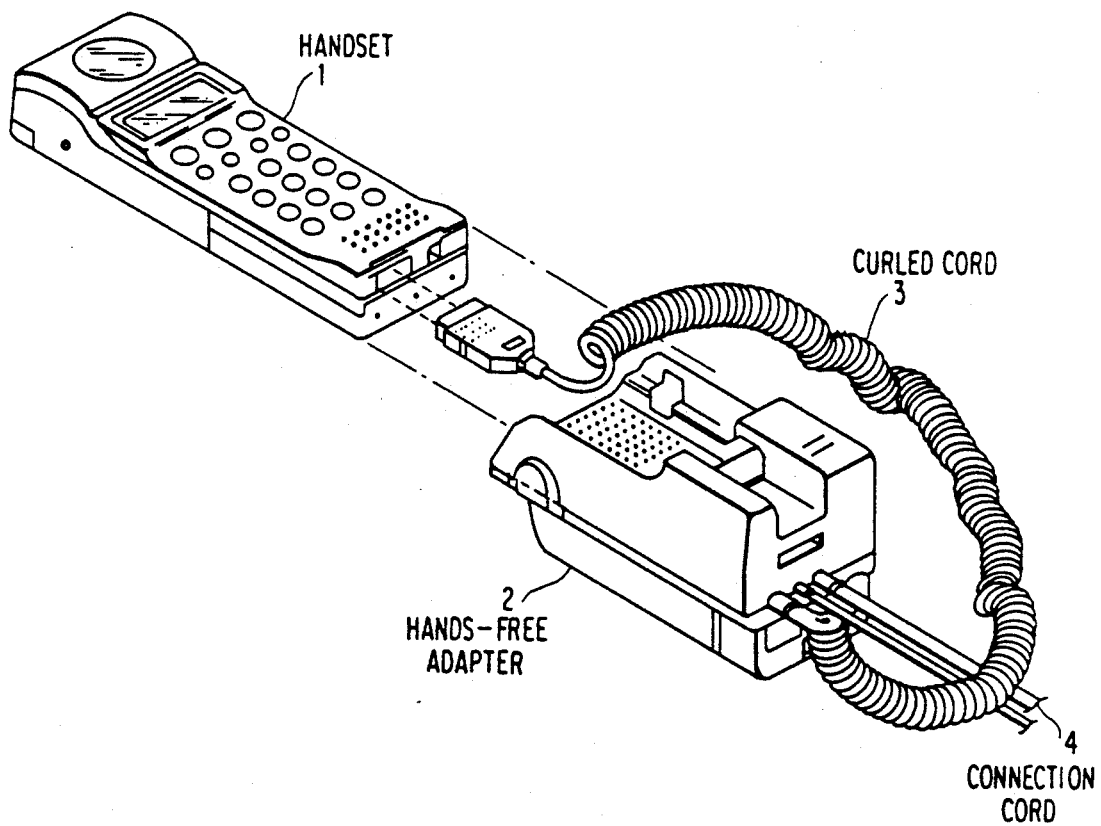
FIG. 1 is an external view showing a specific construction of a hands-free telephone applicable to a vehicle.

Referring to FIG. 1 of the drawings, a hands-free telephone for on-board use has a handset 1, a hands-free adapter 2, and a curled cord 3 connecting them to each other. The user of the telephone may hold conversation by holding the handset 1 by hand or in a hands-free state, i.e., with the handset 1 being loaded on the hands-free adapter 2. The handset 1 has an antenna, not shown, a radio section, a dialing unit, and a receive circuit and a transmit circuit which will be used when the hands-free conversation is not held. The hands-free adapter 2 includes a part of a hands-free telephone unit. A speaker and a microphone, not shown, included in the hands-free telephone unit are connected to one end of a connection cord 4 and fixed in place in the vehicle cabin. The telephone has substantially the same configuration both in a preferred embodiment of the present invention and in the prior art which will be described. It has been customary to provide a variable resistor on the outer periphery of the adapter 2 to allow the user to adjust by hand the volume of voice coming out of the speaker. In contrast, the illustrative embodiment implements automatic volume adjustment by an additional variable attenuator, or variolosser, which is incorporated in the adapter 2.

Figure 2:
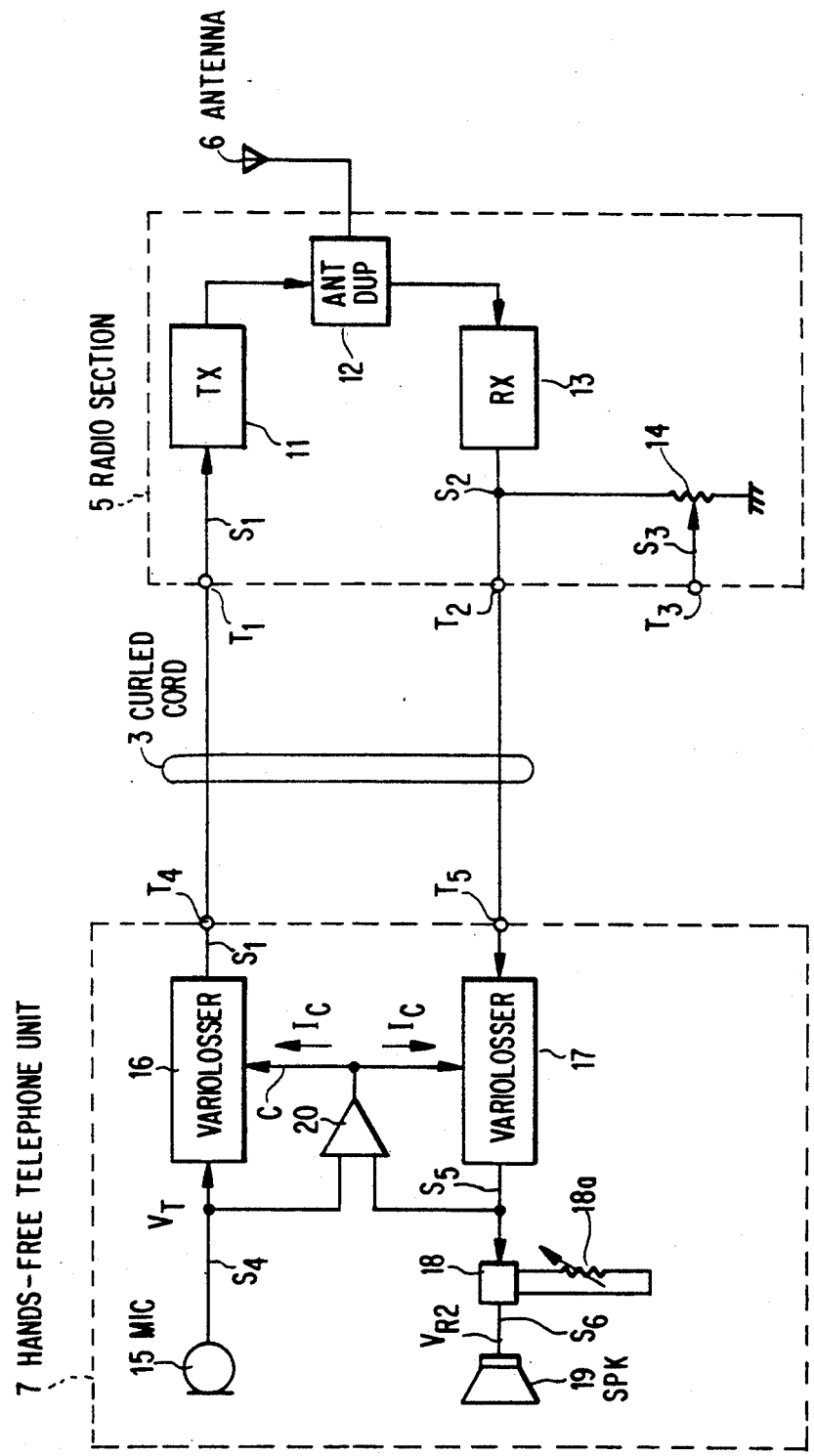
FIG. 2 is a block diagram schematically showing a prior art hands-free telephone.

FIG. 2 shows a prior art hands-free telephone in a schematic block diagram. As shown, the prior art telephone has a radio section 5 and an antenna 6 accommodated in the handset 1, and a hands-free telephone unit 7 partly incorporated in the hands-free adapter 2.

In the radio section 5, a transmit signal $S_1$ coming in through a terminal $T_1$ is converted into a radio signal by a transmitter (TX) 11. The radio signal is routed through an antenna duplexer 12 to the antenna 6. A radio signal coming in through the antenna 6 is fed to a receiver (RX) 13 via the antenna duplexer 12. In response, the receiver 13 converts the input signal into a receive signal $S_2$ and applies it to a terminal $T_2$. The receive signal $S_2$ is adjusted in level by a variable resistor 14 and then fed to a terminal $T_3$ as a receive signal $S_3$. The terminals $T_1$ and $T_3$ are adapted to be connected to, respectively, a mouthpiece microphone and an earpiece receiver built in the handset 1 (FIG. 1). The variable resistor 14 may be composed of a potentiometer.

In the hands-free telephone unit 7, the user's voice (audible signal) conveyed to microphone 15 is converted, or transduced, into a transmit signal $S_4$ whose level is $V_T$. The transmit signal $S_4$ is attenuated by a variable attenuator, or variolosser, 16 and then applied to a terminal $T_4$ as the transmit signal $S_1$. The receive signal $S_2$ emitted via the terminal $T_2$ of the radio section 5 is delivered to a terminal $T_5$ by the curled cord 3. The receive signal $S_2$ is attenuated by a variable attenuator, or variolosser, 17 to become a receiver signal $S_5$ whose level is $V_R$. The receive signal $S_5$ is attenuated by a variable resistor circuit 18. The output of the circuit 18, i.e., a receive signal $S_6$ having a level of $V_{R2}$ is fed to a speaker 19 to be thereby transduced into an audible signal (voice). The attenuation by the individual variolossers 16 and 17 is controlled by a control signal C. Specifically, a comparator 20 generates the control signal C by comparing the level of the transmit signal $S_4$ and that of the receive signal $S_5$. It is to be noted that the microphone 15, speaker 19, variable resistor circuit 18 and variable resistor 18a included in the hands-free telephone unit 7 are located in the hands-free adapter 2, FIG. 1.

Assuming that the attenuation by the variable resistor circuit 18 is $L_{VOL1}$ (dB), the voltage level $V_{R2}$ (dBV) of the receive signal $S_6$ in terms of decibel is related to the voltage level $V_R$ (dBV) of the receive signal $S_5$, as follows:

$$V_{R2} = V_R - L_{VOL1} \tag{1}$$

In the prior art system shown in FIG. 2, the user may adjust the volume of received voice emitted from the speaker 19 by changing the resistance of the variable resistor 18a of variable resistor circuit 18 by hand. The prior art system, therefore, is not practicable unless the hands-free telephone unit 7 is provided with the variable resistor 18a. It is difficult, however, to reduce the dimensions of the variable resistor 18a and, therefore, to allocate an exclusive space for the variable resistor 18a in the telephone unit 7 which is used in a vehicle cabin or similar narrow compartment. Another approach for the adjustment of volume is to apply the receive signal coming out via the terminal $T_3$ of the radio section 5 to the terminal $T_5$ and to change the resistance of the variable resistor 14. Such an approach, however, causes the level $V_R$ of the receive signal fed to the comparator 20 to fluctuate, resulting in unstable volume control in the event of transmission/reception switching.

Figure 3:
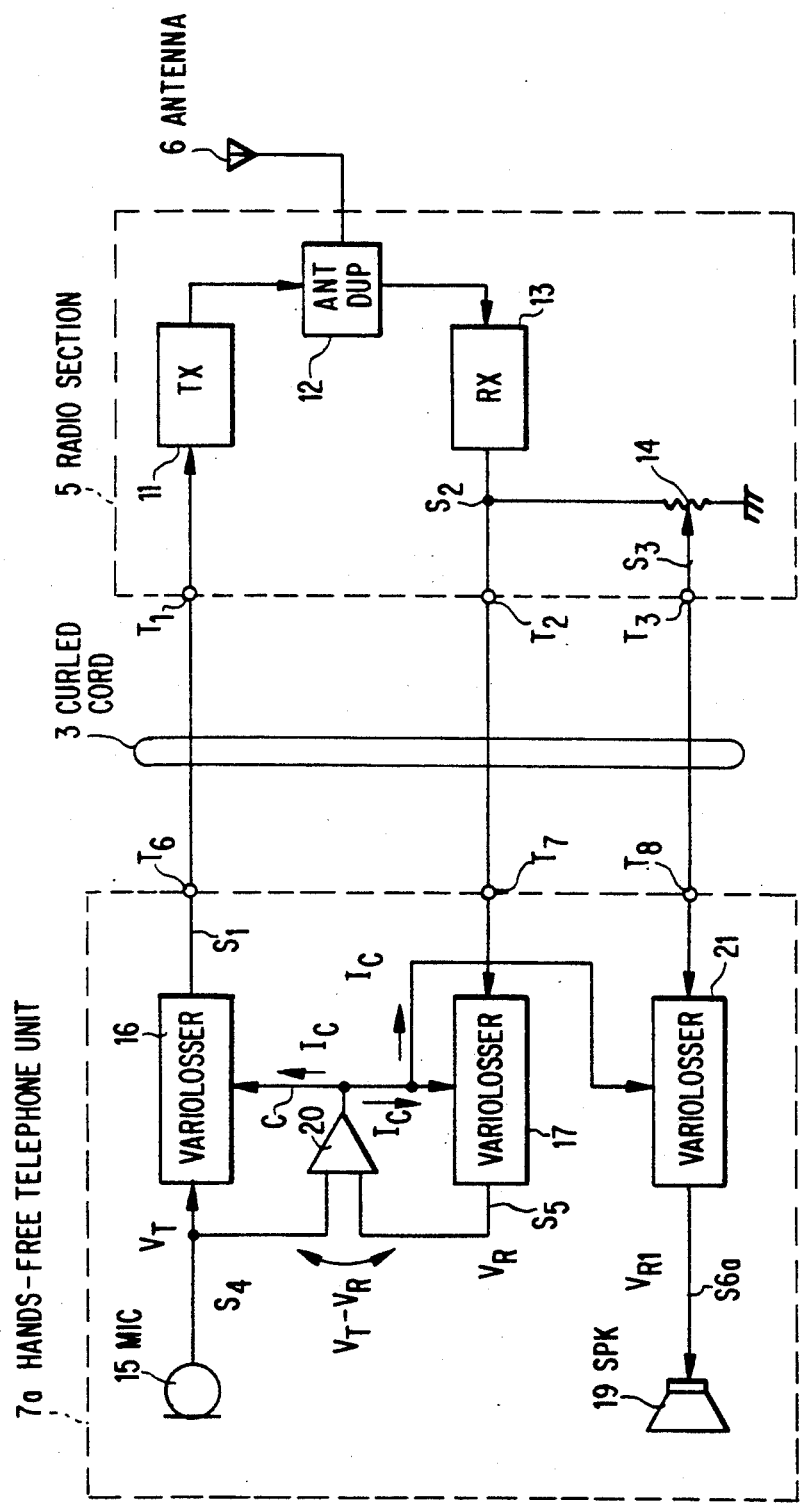
FIG. 3 is a block diagram schematically showing a hands-free telephone embodying the present invention.

Referring to FIG. 3, an on-board hands-free telephone embodying the present invention is shown and includes a radio section 5 incorporated in the handset 1 and a hands-free telephone unit 7a. The radio section 5 and antenna 6 are identical with those shown in FIG. 2. The microphone 15 and speaker 19 included in the telephone unit 7a are the same as those shown in FIG. 2 and installed in the vehicle cabin outside of the hands-free adapter 2. The telephone unit 7a has variolossers 16 and 17 and a comparator 20 which are also identical with those shown in FIG. 2, except that the output $V_R$ of the variolosser 17 is fed only to the comparator 20. In the illustrative embodiment, the telephone unit 7a is additionally provided with a terminal $T_8$ and a variolosser 21. The terminal $T_8$ is connected to a terminal $T_3$ of the radio section 5 by a curled cord 3. The variolosser 21 is connected at an input terminal thereof to the terminal $T_8$, at an output terminal to the speaker 19, and at a control terminal to the output terminal of the comparator 20.

Figure 4:
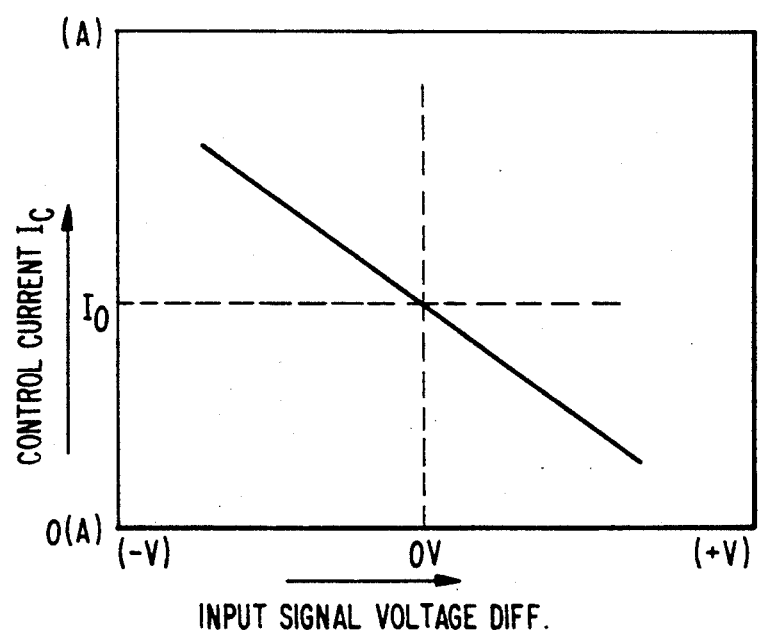
FIG. 4 is a graph representative of a relation between the difference between input signal voltages and the control signal current.

In operation, the microphone 15 transforms the conveyed voice into a transmit signal $S_4$. The comparator 20 produces a control signal current Ic which is inversely proportional to a difference between the voltage $V_T$ of the transmit signal $S_4$ emitted from the microphone 15 and the voltage $V_R$ of the receive signal $S_5$ fed from the variolosser 17, i.e., an input signal voltage difference $(V_T - V_R)$. FIG. 4 indicates a relation between the input signal voltage difference $(V_T - V_R)$ and the control signal current Ic. As shown, the control signal current Ic decreases with the increase in the input signal voltage difference. A control signal C having such a control signal current Ic is applied to the variolossers 16, 17 and 21. The variolosser 16 attenuates the transmit signal $S_4$ fed from the microphone 15 and delivers the resulting signal, i.e., the transmit signal $S_1$ to a terminal $T_6$ which is connected to the terminal $T_1$ of the radio section 5 by the curled cord 3. The attenuation $L_T$ by the variolosser 16 is a function of the control signal current Ic of the control signal C and is produced by:

$$L_T = F(Ic) \text{ (dB)} \qquad (2)$$

Figure 5:
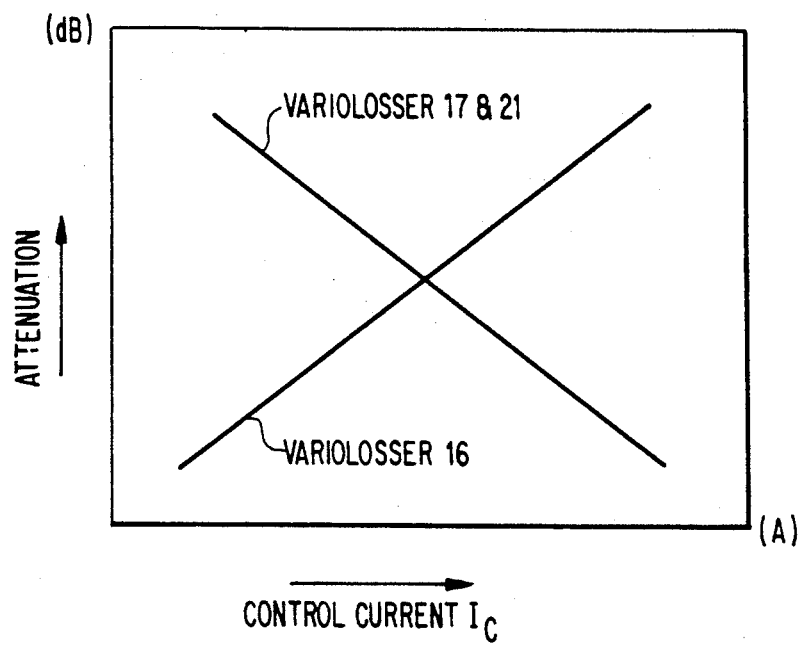
FIG. 5 is a graph indicative of a relation between the input voltage to a variable attenuator and the attenuation.

FIG. 5 indicates the attenuation characteristic of the variolosser 16. As shown, the attenuation increases with the increase in the control signal current Ic. The variolosser 17 attenuates the receive signal $S_2$ applied thereto via a terminal $T_7$ and delivers the receive signal $S_5$ having the voltage $V_R$ to the comparator 20. The attenuation $L_R$ by the variolosser 17 is a function of the control signal current Ic of the control signal C and is expressed as:

$$L_R = X - F(Ic) \text{ (dB)} \qquad (3)$$

where X is the maximum attenuation available with the variolosser 17. As FIG. 5 indicates, the attenuation by the variolosser 17 decreases with the increase in the control signal current Ic. The variolosser 21 attenuates the receive signal $S_3$ emitted via the terminal $T_3$ of the radio section 5 and fed thereto via the curled cord 3 and terminal $T_8$. A receive signal $S_{6a}$ voltage $V_{R1}$ emitted by the variolosser 21 is fed to the speaker 19. The attenuation by the variolosser 21 is a function of the control signal current Ic of the control signal C and has the same characteristic as the attenuation $L_R$ by the variolosser 17, i.e., the equation (3). In this manner, when voice is entered on the microphone 15, the attenuations by the variolossers 17 and 21 are increased while, on the reception of a signal, the attenuation of the variolosser 16 is increased, whereby howling or singing is eliminated. The variolossers 16, 17 and 21 each attenuates the voice signal bandwidth substantially flat and may be readily implemented as a transistor and diode circuit which per se is well known in the art. While the attenuation characteristic has been shown and described as varying linearly with the control signal current Ic in terms of decibel, it may of course involve some curvature.

Specific values with which the hands-free telephone system described above may be designed are as follows. The variolossers 16, 17 and 21 are variable in attenuation over the range of approximately 10 (dB). The voltage difference between the input signals to the comparator 20 is 2 (V) at maximum. The levels of the transmit signal $S_1$ and receive signal $S_2$ as measured at the terminals $T_1$ and $T_2$, respectively, are $-20$ (dBV) each.

How the system adjusts the volume of voice coming out of the speaker 19 will be described. The output signal of the microphone 15 included in the hands-free telephone unit 7a, i.e., the transmit signal $S_4$ is applied to the comparator 20 and variolosser 16. By attenuating the transmit signal $S_4$, the variolosser 16 delivers the resulting signal $S_1$ to the terminal $T_6$. In this instance, the attenuation by the variolosser 16 is the attenuation $L_T$ represented by the equation (2). The transmit signal $S_1$ is fed from the terminal $T_6$ to the terminal $T_1$ of the radio section 5. The transmitter 11 of the radio section 5 transforms the transmit signal $S_1$ into a high frequency signal, or radio signal. The radio signal is applied to the antenna 6 via the antenna duplexer 12 and therefrom to the base station included in the mobile telecommunications system.

A radio signal from the base station comes in through the antenna 6 and is applied to the receiver 13 via the antenna duplexer 12 of the radio section 5. The receiver 13 converts the radio signal into a receive signal $S_2$ and feeds it to the terminal $T_2$ and variable resistor 14. The variable resistor 14 attenuates the receive signal $S_2$ and applies the resulting receive signal $S_3$ to the terminal $T_3$. The receive signals $S_2$ and $S_3$ are delivered to the hands-free telephone unit 7a by the curled cord 3. In response, the variolosser 21 of the telephone unit 7a further attenuates the attenuated receive signal $S_3$ to produce a receive signal $S_{6a}$ whose voltage is $V_{R1}$. Specifically, the attenuation by the variolosser 21 is the attenuation $L_R$ represented by the equation (3). The speaker 19 converts the receive signal $S_{6a}$ into voice.

The variolosser 17 attenuates the receive signal $S_2$ to produce a receive signal $S_5$ whose voltage is $V_R$ and applies it to the comparator 20, the attenuation being $L_R$ as represented by the equation (3). The comparator 20 generates a control signal C having a control signal current Ic representative of a difference between the voltage $V_R$ of the signal $S_5$ and the voltage $V_T$ of the transmit signal $S_4$. The control signal C changes the attenuations by the three variolossers 16, 17 and 21 accordingly. In the illustrative embodiment, all the variolossers 16, 17 and 21 are controlled by a single control circuit C having a control signal current Ic which is inversely proportional to the difference between input signal voltages. Alternatively, in addition to such a control signal C, a control signal Ca having a control signal current Ica which is proportional to the difference between input signal voltages may be generated, in which case the control signal Ca will control the varilossers 17 and 21 and the control signal C, the variolosser 16. In this case, the attenuation by the variolossers 17 and 21 will be selected to increase with the increase in the control signal current Ica.

Assume that the input voltages $V_T$ and $V_R$ to the comparator 20, respectively, have the same signal voltage levels as those in the prior art hands-free telephone shown in FIG. 2, and that the attenuation of the received signal by the variable resister 14 is $L_{VOL}$ (dB). Then, the input voltage $V_{R1}$ to the speaker 19 in terms of decibel is produced by:

$$\begin{aligned} V_{R1} &= V_R - L_R - L_{VOL} + L_R \\ &= V_R - L_{VOL} \end{aligned} \qquad (4)$$

It should be noted in equation (4) that the attenuations $L_R$, $L_{VOL}$ have a negative value.

In the prior art hands-free telephone of FIG. 2, the input voltage $V_{R1}$ (dBV) to the speaker 19 in terms of decibel is represented by the equation (1). When the attenuations $L_{VOL1}$ and $L_{VOL}$ by the variable resistors 18a and 14 as represented by the equations (1) and (4), respectively, are equalized, the voltages $V_{R1}$ and $V_{R2}$ input to the speaker 19 will become equal.

In summary, in accordance with the present invention, the variable resistor 14 included in the radio section 5 is operable to adjust the volume of voice to be produced from the speaker 19 of the hands-free telephone unit 7a. Concerning howling and singing, the present invention has the same function as the prior art and achieves comparable performance. This is successful in eliminating the need for an extra space otherwise allocated to a variable resistor for volume adjustment (18a, FIG. 2). Although the present invention needs the additional variolosser 21, the variolosser 21 can be implemented in an extremely small size by IC technologies and can be fully incorporated in the hands-free adapter 2. The elimination of the exclusive variable resistor for volume adjustment leads to the miniaturization of a hands-free telephone system.

What is claimed is:

1. A hands-free telephone comprising:
   a radio section; and
   a hands-free telephone unit;
   said radio section comprising:
   a transmitting and receiving section for transmitting a transmit signal by converting said transmit signal into a radio signal and converting a received radio signal into a receive signal; and
   a first attenuating section for variably attenuating the receive signal from said transmitting and receiving section;
   said hands-free telephone unit comprising:
   a second attenuating section for variably attenuating the transmit signal from a microphone section in response to a control signal;
   a third attenuating section for variably attenuating the receive signal from said transmitting and receiving section in response to a control signal;
   a fourth attenuating section for variably attenuating the receive signal from said first attenuating section in response to a control signal;
   a comparing section for emitting the control signals in response to the transmit signals from the microphone section and the receive signal from said third attenuating section; and
   a voice emitting section for converting the receive signal from said fourth attenuating section into voice.

2. A telephone as claimed in claim 1, wherein said third and fourth attenuating sections variably attenuate in response to the same control signal.

3. A telephone as claimed in claim 1, wherein said third and fourth attenuating sections have the same attenuation characteristic.

4. An apparatus having a handset and a hands-free unit, said handset comprising:
   transmitter means for transmitting a transmit signal over a radio frequency, said transmitter means being connected to a mouthpiece microphone;
   receiver means for receiving and demodulating a radio signal to produce a receive signal; and
   volume means for manually changing the level of said receive signal to produce a level-changed receive signal, said volume means being adapted to supply said level-changed receive signal to an earpiece receiver;
   said hands-free unit comprising:
   microphone means for transducing an audible signal into said transmit signal;
   first attenuator means for attenuating the level of said transmit signal in response to a control signal;
   second attenuator means for attenuating the level of said receive signal in response to said control signal;
   third attenuator means for attenuating the level of said level-changed receive signal in response to said control signal;
   control means for producing said control signal in response to said transmit signal and to the output of said second attenuator means; and
   speaker means for transducing the output of said third attenuate means into an audible signal.

5. An apparatus as claimed in claim 4, wherein each of said first, second and third attenuator means comprises a variolosser.

6. An apparatus as claimed in claim 4, wherein said volume means comprises a potentiometer.

7. An apparatus as claimed 4, further comprising:
   adapter means for accommodating therein said first and second attenuator;
   first connector means for electrically connecting said adapter means to said microphone and speaker means; and
   second connector means for electrically connecting said adapter means to said handset.

8. A method of controlling the output level of a speaker in a hands-free telephone, comprising the following steps of:
   converting an audible signal into a transmit signal;
   transmitting said transmit signal over a radio frequency;
   receiving and demodulating a radio signal to produce a receive signal;
   manually changing the level of said receive signal to produce a level-changed receive signal;
   responsive to said transmit and receive signals, producing a control signal;
   responsive to said control signal, changing the level of said level-changed receive signal to produce a speaker signal; and
   converting said speaker signal into an audible signal.

9. A hands-free telephone comprising:
   receiver means for receiving a signal to produce a received signal;
   variable resistor means for attenuating said received signal to produce a level-controlled signal;
   first variable attenuating means responsive to a control signal for attenuating a signal from a microphone to produce a first attenuated signal;
   transmitter means for transmitting said first attenuated signal;
   second variable attenuator means responsive to said control signal for attenuating said received signal to produce a second attenuated signal;
   comparator means responsive to said signal from said microphone and said second attenuated signal for producing said control signal;
   third variable attenuator means responsive to said control signal for attenuating said level-controlled signal to produce a third attenuated signal; and
   voice transducer means for transducing said third attenuated signal into voice.

10. A hands-free telephone comprising:
    a handset including radio section means for transmitting a signal over a radio frequency signal and receiving a radio frequency signal to produce a received signal, and volume means for changing the level of said received signal to produce a level-changed signal;
    a hands-free adaptor including first attenuator means for variably attenuating a voice signal from a microphone and providing the attenuated voice signal to said radio section means, second attenuator means for variably attenuating said received signal, and third attenuator means for variably attenuating said level-changed signal; and
    speaker means for converting the output of said third attenuator means into an audible signal.

11. In a combination of a hands-free telephone unit and a radio section, said hands-free telephone unit comprising:

transmit variolosser means for controlling the level of a transmit signal in response to a control signal;

first receive variolosser means for controlling the level of a first receive signal in response to said control signal;

second receive variolosser means for controlling the level of a second receive signal in response to said control signal; and level control means for producing said control signal in response to said transmit signal and the output of said first receive variolosser means;

said radio section comprising:

transmitter means for transmitting the output of said transmit variolosser means over a radio frequency;

receiver means for receiving and converting a radio signal into said first receive signal; and attenuator means for controlling the level of said first receive signal to produce said second receive signal.

12. A combination as claimed in claim 11, wherein said level control means comprises:

voltage comparator means for voltage comparing said transmit signal and the output of said first receive variolosser means to produce an error signal representative of a voltage difference therebetween and for supplying said error signal to said transmit and first and second receive variolosser means as said control signal.

13. A combination as claimed in claim 11, further comprising:

microphone means for transducing an audible signal into said transmit signal;

speaker means for transducing the output of said second receive variolosser means into an audible signal;

adapter means for accommodating said hands-free section therein;

first connecting means for electrically connecting said microphone and speaker means to said transmit variolosser and second receive variolosser means, respectively; and second connecting means for electrically connecting said transmit variolosser and first and second receive variolosser means to said transmitter, receiver and attenuator means, respectively.

14. A combination as claimed in claim 13, wherein said attenuator means comprises a potentiometer.

* * * * *